(12) United States Patent
Kim et al.

(10) Patent No.: US 11,983,450 B2
(45) Date of Patent: May 14, 2024

(54) GENERATING USER INTERFACE FOR ONBOARDING

(71) Applicant: Hewlett-Packard Development Company, L.P., Spring, TX (US)

(72) Inventors: Junghun Kim, Seongnam-si (KR); Min Namgoong, Seongnam-si (KR); Jinkyu Kook, Seongnam-si (KR); Sangmi Kim, Seongnam-si (KR); Byeongju Hwang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/009,818

(22) PCT Filed: Dec. 7, 2020

(86) PCT No.: PCT/US2020/063567
§ 371 (c)(1),
(2) Date: Dec. 12, 2022

(87) PCT Pub. No.: WO2022/005510
PCT Pub. Date: Jan. 6, 2022

(65) Prior Publication Data
US 2023/0221903 A1 Jul. 13, 2023

(30) Foreign Application Priority Data
Jul. 2, 2020 (KR) .......... 10-2020-0081450

(51) Int. Cl.
*G06F 3/12* (2006.01)
*G06F 9/451* (2018.01)

(52) U.S. Cl.
CPC ............ *G06F 3/123* (2013.01); *G06F 3/1204* (2013.01); *G06F 3/1231* (2013.01); *G06F 9/451* (2018.02); *G06F 3/1288* (2013.01)

(58) Field of Classification Search
None
See application file for complete search history.

(56) References Cited

U.S. PATENT DOCUMENTS 10,743,176 B1 * 8/2020 Khan ............. H04W 12/48
2017/0178225 A1   6/2017 Suzuki et al.
(Continued)

FOREIGN PATENT DOCUMENTS

JP   2019-149599 A   9/2019
JP   2019-159890 A   9/2019
(Continued)

*Primary Examiner* — Frantz Bataille
(74) *Attorney, Agent, or Firm* — Brooks, Cameron & Huebsch, PLLC

(57) ABSTRACT

An example server to process onboarding includes a communication interface unit, a memory to store instructions, and a processor. The processor is to execute instructions stored in the memory to receive information on a user interface screen for onboarding from a client device through the communication interface unit, and transmit information for generating a next user interface screen to be displayed on the client device to the client device through the communication interface unit based on the received information on the current user interface screen and information on a process of the onboarding.

15 Claims, 10 Drawing Sheets

(56) References Cited

U.S. PATENT DOCUMENTS

2019/0081992 A1    3/2019  Lin et al.
2019/0335047 A1   10/2019  Tiffanie
2020/0167798 A1*   5/2020  Lee ........................ G06N 20/20

FOREIGN PATENT DOCUMENTS

KR    10-2017-0073485 A    6/2017
WO       2017/040840 A1    3/2017

* cited by examiner

FIG. 9

```
{
"extensionKey": "xxxx.device.onboard.E2E",

"uiInfoList": [

{
    "key": "xxxx.device.onboard.program",
    "activity": "https://xxxxuiprovider.demo.com/v1/ecosystem/accountmgtsvc/accounts/{id}/devices",
    "name": "Program",
    "description": "Program page presented"
    },                                                              — CODE BLOCK 1

{
    "key": "xxxx.device.onboard.offer.valueprop",
    "activity": "https://xxxxuiprovider.demo.com/offer/valueprop",
    "name": "Offer value property",
    "description": "Offer value property"
    },                                                              — CODE BLOCK 2

{
    "key": "xxxx.device.onboard.offer",
    "activity": "https://itpuiprovider.demo.com",
    "name": "Instant Toner Offer",
    "description": "Present ITP Offer"
    },                                                              — CODE BLOCK 3

]
}
```

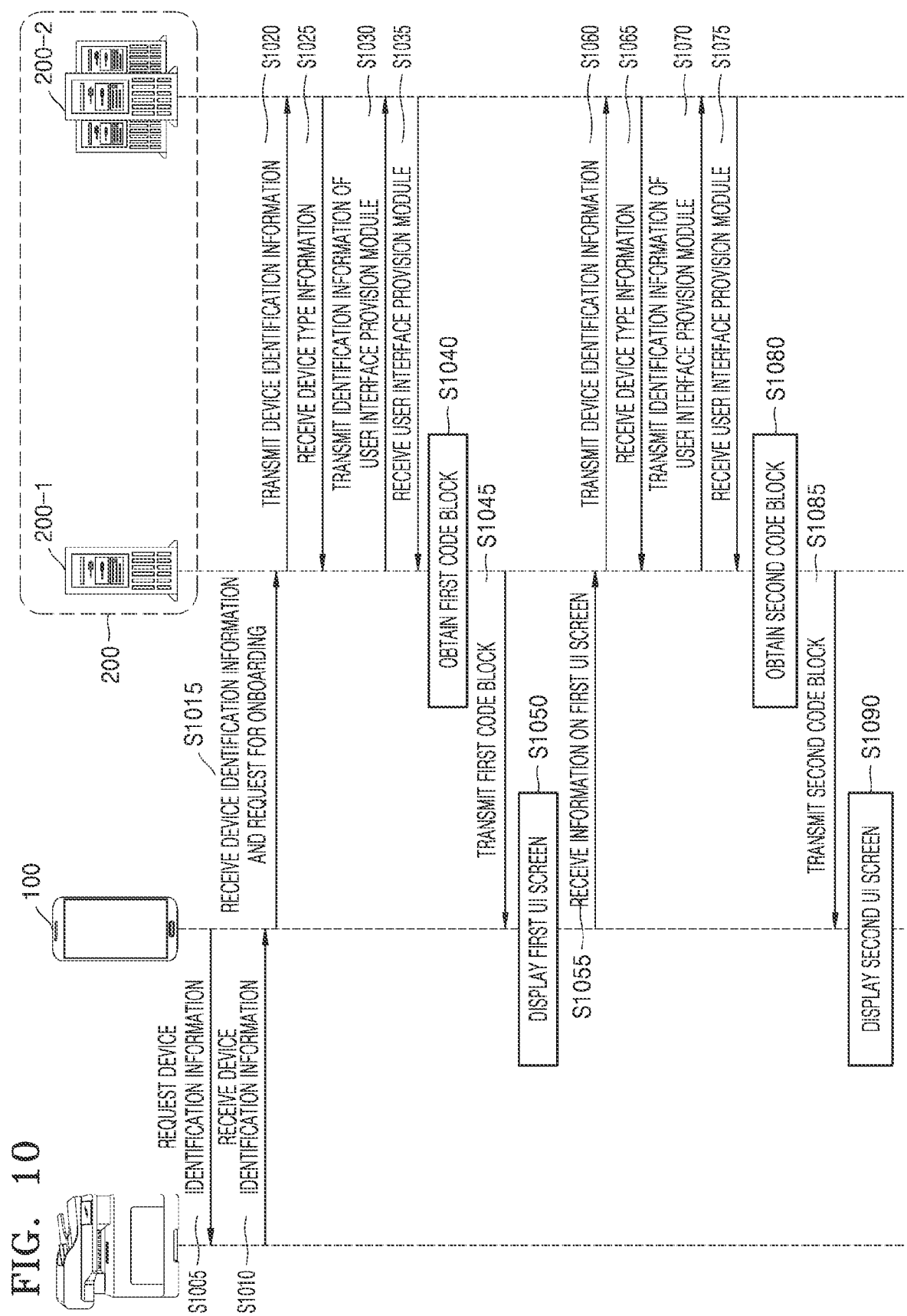

GENERATING USER INTERFACE FOR ONBOARDING

BACKGROUND

For a client device to use a service provided by a server, the client device may perform onboarding which is an operation of registering a user of the client device or the client device with the server. The client device may install and execute a pre-distributed onboarding program to register the user or the client device with the server through an onboarding process.

BRIEF DESCRIPTION OF THE DRAWINGS

FIGS. 8 and 9 are diagrams illustrating a user interface provision module for device onboarding according various examples.

FIG. 10 is a diagram illustrating a process of performing device onboarding according to an example.

DETAILED DESCRIPTION

Figure 1:
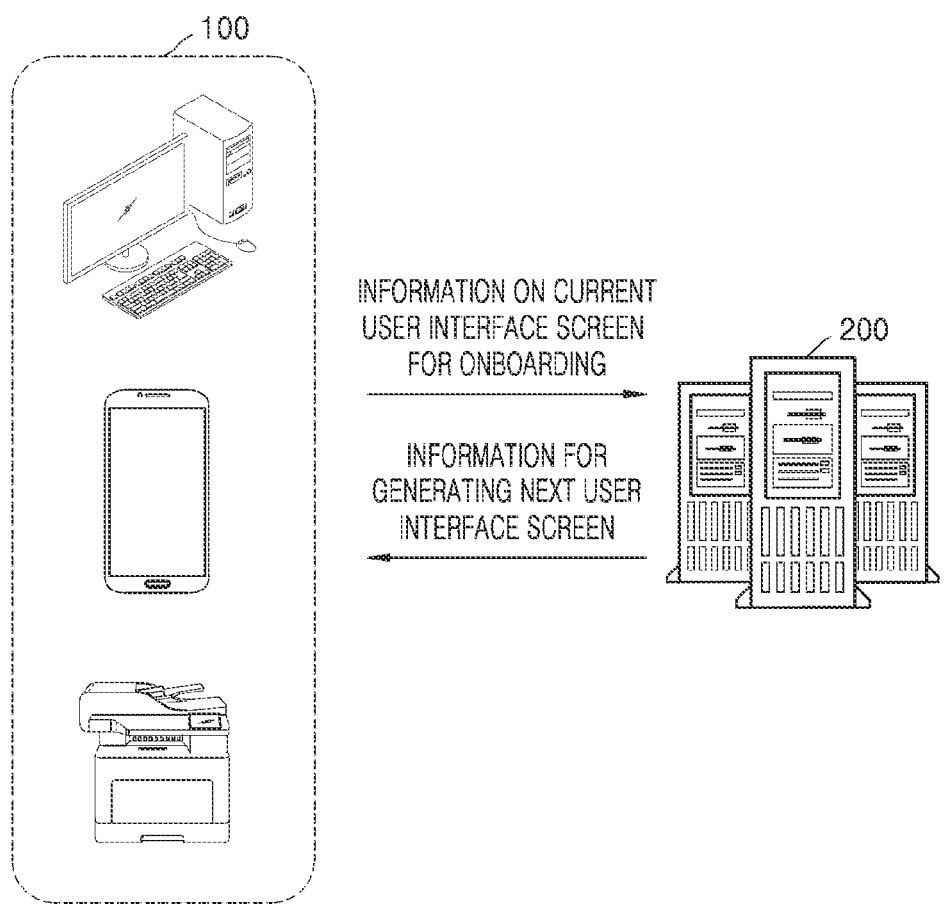
FIG. 1 is a diagram illustrating a service environment including a client device and a server according to an example.

The term "onboarding" refers to an operation of registering various types of onboarding targets, such as a user, a device such as an image forming apparatus, and machine readable instructions such as an application, with a server to use a service provided by the server. A client device may execute an onboarding program stored in the client device to register the user, the client device, or the like with the server through an onboarding process. In order to change the onboarding process, it may be requested to recode the onboarding program to redistribute a new onboarding program to the client device, the onboarding program being pre-distributed and installed to be executed on the client device. Hereinafter, examples in which a server performs onboarding by managing a user interface provision module for onboarding and by transmitting information for generating a user interface screen for onboarding to a client device in response to a request of the client device for the user interface screen for onboarding, will be described.

Hereinafter, examples will be described with reference to the accompanying drawings. In the present specification and the drawings, constituent elements having substantially the same functions are referenced by the same reference numerals, and thus, redundant descriptions thereof may be omitted. Terms such as 'unit', 'module', and the like described in the present specification refer to a unit that processes a function or operation, which may be implemented in hardware or machine readable instructions, or a combination of hardware and machine readable instructions.

FIG. 1 is a diagram illustrating a service environment including a client device and a server according to an example.

Referring to FIG. 1, a client device 100 may include a user terminal such as a smart phone, a tablet personal computer (PC), a laptop, or the like, or an image forming apparatus such as a printer, a copier, a scanner, a fax machine, a multi-function printer, or the like. A server 200 may be a cloud-based platform that provides the client device 100 with a certain service. The server 200 may store and manage a program or an installation file which corresponds to a service that may be provided to the client device 100.

In order for the client device 100 to be provided with a certain service by the server 200, onboarding, which is an operation of registering a user of the client device 100 or the client device 100 with the server 200, needs to be performed. For example, the server 200 may register a user's account or the client device 100 such as an image forming apparatus with the user's account to provide a certain service to the registered user or the client device 100.

FIG. 1 shows an example in which the client device 100 and the server 200 communicate with each other as an example of a service environment in which the client device 100 is provided with a certain service. However, examples of the present disclosure are not limited thereto. The server 200 may be in the form of a distributed system including a plurality of servers. For example, the server 200 may include a first server that processes a request for onboarding from the client device 100 and a second server based on a cloud platform that supports various services.

Figure 2:
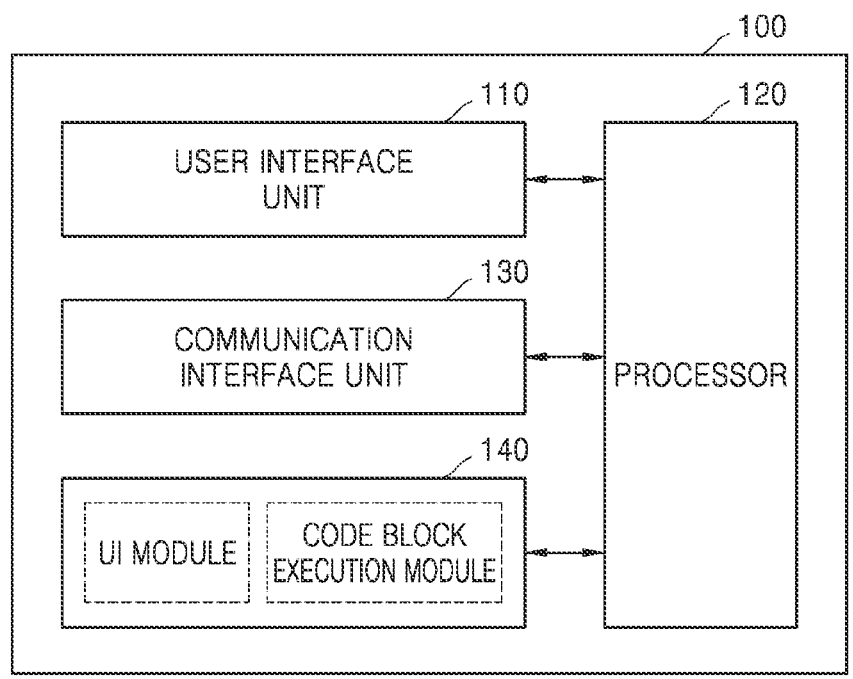
FIG. 2 is a diagram illustrating a client device according to an example.

FIG. 2 is a diagram illustrating a client device according to an example.

Referring to FIG. 2, the client device 100 may include a user interface unit 110, a processor 120, a communication interface unit 130, and a memory 140.

The user interface unit 110 may include an input unit to receive a user input, such as a user input for onboarding, from a user, and an output unit to display a user interface screen, such as a user interface screen corresponding to a step for onboarding. For example, the user interface unit 110 may be in the form of a touch screen.

The processor 120 may execute an instruction stored in the memory 140 to control an operation or a function performed by the client device 100. The processor 120 may include a processing module. The processor 120 may control other components of the client device 100 to perform an operation corresponding to a user input received through the user interface unit 110. The processor 120 may execute an instruction, a machine readable instructions module, a program code, or the like stored in the memory 140, read data or a file stored in the memory 140, or store new program code in the memory 140.

The communication interface unit 130 may perform wired or wireless communication with another device or a network. To that end, the communication interface unit 130 may include a communication module (e.g., transceiver) that supports various wired or wireless communication methods. The client device 100 may be connected to the server 200 or an external device through the communication interface unit 130. The client device 100 may receive information for generating the user interface screen for onboarding from the server 200. For example, the client device 100 may receive a code block included in a user interface provision module for onboarding from the server 200 through the communication interface unit 130 to execute the same.

The memory 140 may store an instruction. In an example, the processor 120 may correspond to a computer capable of executing an instruction stored in the memory 140. The memory 140 may store an instruction, a machine readable instructions module, a program, or the like. The memory 140 may include of a random access memory (RAM), a static random access memory (SRAM), a read-only memory (ROM), a flash memory, an electrically erasable programmable read-only memory (EEPROM), a programmable read-only memory (PROM), a magnetic memory, a magnetic disk, an optical disk, or the like. The memory 140 may store a user interface (UI) module and a code block execution module. The UI module and the code block execution module may each be a machine readable instructions module or a program including an instruction.

The UI module may confirm a user input with respect to the user interface screen displayed on the user interface unit 110 to output the user interface screen generated from the code block execution module to the user interface unit 110. The code block execution module may execute the code block received by the client device 100 to generate the user interface screen for onboarding. The processor 120 may retrieve the UI module and the code block execution module from the memory 140 to execute the corresponding instructions.

Based on the above-described configuration, the processor 120 of the client device 100 may execute an instruction stored in the memory 140 to transmit information on a current user interface screen for onboarding to the server 200 through the communication interface unit 130 and receive information for generating a next user interface screen from the server 200 through the communication interface unit 130. The processor 120 may receive the information for generating the next user interface screen to be displayed on the client device 100 from the server 200 through the communication interface unit 130 in response to the information on the current user interface screen transmitted to the server 200. The processor 120 may control the next user interface screen to be displayed on the user interface unit 110 based on the received information for generating the next user interface screen.

Information on the user interface screen may include information on a target of onboarding and identification information of the information for generating the user interface screen. For example, the information on the target of onboarding may include information indicating that the target of onboarding is a user, a device, or machine readable instructions. The identification information of the information for generating the user interface screen may include a key value of the code block for generating the user interface screen. In a case in which the information on the current user interface screen further includes information on an event that has occurred on the current user interface screen displayed on the user interface unit 110, the processor 120 may receive the information for generating the next user interface screen from the server 200 through the communication interface unit 130 according to whether the process of onboarding corresponding to the current user interface screen is completed and further based on the information on the event in response to the information on the current user interface screen transmitted to the server 200.

As the client device 100 sequentially executes the information for generating the next user interface screen received from the server 200, for example, executes the code block for generating the user interface screen, the client device 100 may generate and display user interface screens corresponding to a series of steps for onboarding and confirm the user input with respect to the displayed user interface screen. The client device 100 may request the user interface screen for onboarding of the server 200 and repeat a process of obtaining the code block for generating the user interface screen to be displayed on the client device 100 to proceed with the series of steps for onboarding.

Figure 3:
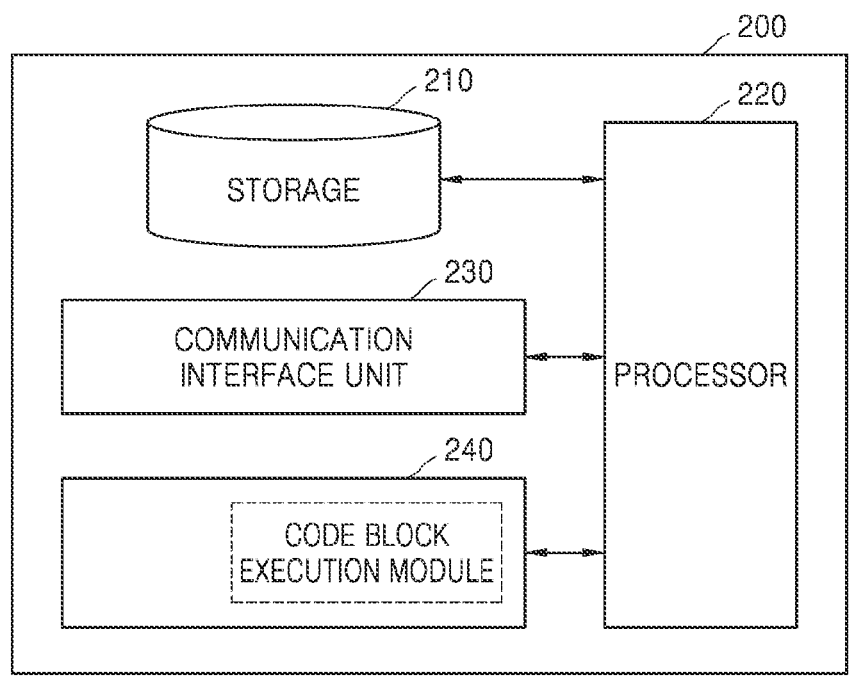
FIG. 3 is a diagram illustrating a server according to an example.

FIG. 3 is a diagram illustrating a server according to an example.

Referring to FIG. 3, the server 200 may include a storage 210, a processor 220, a communication interface unit 230, and a memory 240. If the server 200 includes a plurality of servers, each server may include components corresponding to the storage 210, the processor 220, the communication interface unit 230, and the memory 240.

The storage 210 may store a program, a part of a program, or data corresponding to a certain service. If the server 200 is a cloud server based on a cloud platform and is a server to support various services, the storage 210 may store programs corresponding to various services in a database.

The processor 220 may execute an instruction stored in the memory 240 to control an operation or a function executed by the server 200. The processor 220 may include a processing module. The processor 220 may include, for example, a central processing unit, a microprocessor, a graphics processing unit, an application specific integrated circuit (ASIC), a digital signal processor (DSP), a field programmable gate array (FPGA), and the like. The processor 220 may control other components of the server 200 to perform operations corresponding to an external request received through the communication interface unit 230. The processor 220 may execute an instruction, a machine readable instructions module, program code, or the like stored in the memory 240 or the storage 210, read data or a file stored in the memory 240 or the storage 210, or store new program code in the memory 240 or the storage 210.

The communication interface unit 230 may perform wired or wireless communication with the client device 100 or another server or a network. To that end, the communication interface unit 230 may include a communication module (e.g., transceiver) that supports various wired or wireless communication methods. The server 200 may be connected to the communication interface unit 130 of the client device 100 through the communication interface unit 230. For example, the server 200 may receive information on a current user interface screen for onboarding from the client device 100 through the communication interface unit 230, and transmit information for generating a next user interface screen for onboarding to the client device 100. As an example, the server 200 may transmit some code blocks included in a user interface provision module for onboarding to the client device 100.

The memory 240 may store an instruction. In an example, the processor 220 may correspond to a computer capable of executing instructions stored in the memory 240. The memory 240 may store an instruction, a machine readable instructions module, a program, or the like. The memory 240 may store a code block management module. The code block management module may include a machine readable instructions module or a program including an instruction.

The code block management module may obtain a code block to be transmitted to the client device 100 from among code blocks that generate user interface screens corresponding to a series of steps for onboarding. To that end, the code block management module may receive the user interface provision module corresponding to a target of onboarding from the database of an external server and select an optimum code block to be transmitted to the client device 100 from among the code blocks included in the user interface provision module. The processor 220 may retrieve the code block management module from the memory 240 to execute the corresponding instructions.

Based on the above-described example, the processor 220 of the server 200 may execute an instruction stored in the memory 240 to receive the information on the current user interface screen for onboarding from the client device 100 through the communication interface unit 230, and transmit the information for generating the next user interface screen to be displayed on the client device 100 to the client device 100 through the communication interface unit 230 based on the received information on the current user interface screen and information on the process of onboarding. The information on the current user interface screen received from the client device 100 may include information on the target of onboarding and identification information of the information for generating the current user interface screen displayed on the client device 100. The information on the onboarding process may include information corresponding to a sequence of steps for onboarding, for example, information capable of confirming the order between information for generating a user interface screen.

The server 200 may receive a request for the user interface screen for onboarding from the client device 100, obtain a code block for generating the user interface screen to be displayed on the client device 100 from among the code blocks that generate user interface screens corresponding to the series of steps for onboarding, and transmit the obtained code block to the client device 100. If the client device 100 requests the user interface screen for onboarding, the server 200 may repeat such an operation until onboarding is completed.

Figure 4:
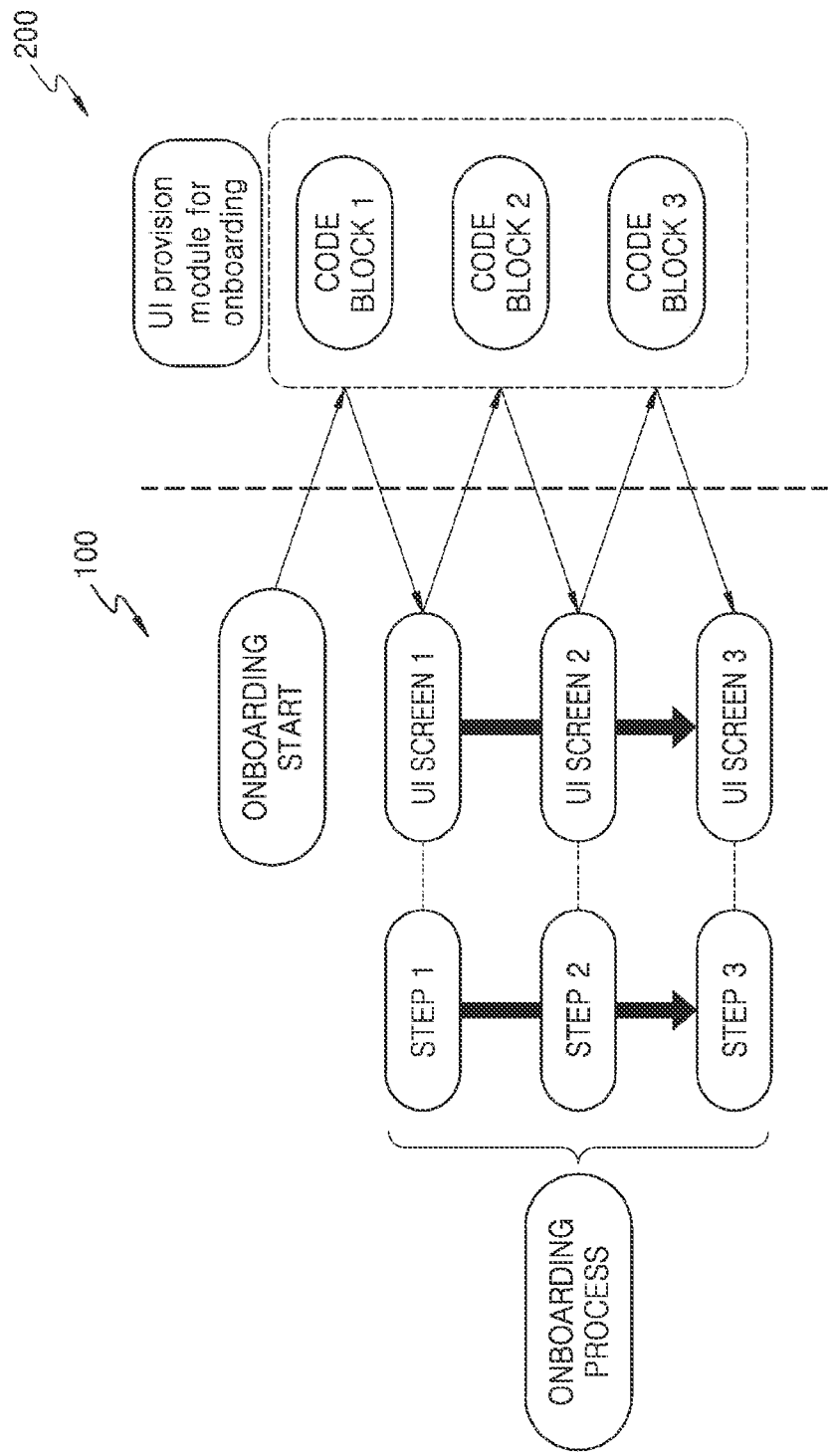
FIG. 4 is a diagram illustrating a process in which a client device and a server perform onboarding according to an example.

FIG. 4 is a diagram illustrating a process in which a client device and a server perform onboarding according to an example.

Referring to FIG. 4, a "user interface (UI) provision module" refers to information for generating a user interface screen corresponding to each step of an onboarding process, and includes code blocks that generate user interface screens corresponding to a series of steps for onboarding. A "code block" may include declarations and/or statements. The code block may be a unit structure of program code, and one code block may be in a form including nested code blocks. As illustrated in FIG. 4, for example, in a case in which the onboarding process includes a series of steps such as 'step 1', 'step 2', and 'step 3', there may be a user interface provision module including 'code block 1', 'code block 2', and 'code block 3' corresponding to each step, respectively. In a case in which there is a change in the series of steps for onboarding, the code blocks constituting the user interface provision module may be recoded in response to the change in the series of steps for onboarding.

The client device 100 may notify the server 200 of the start of onboarding to request the user interface screen for onboarding. The client device 100 may transmit information on the target of onboarding and identification information of a code block that generates the user interface screen for onboarding to the server 200. In a case in which the start of onboarding is notified, the identification information of the code block may be a 'null' value.

In response, the server 200 may transmit the 'code block 1', which is the first code block of the user interface provision module corresponding to a target of onboarding, to the client device 100. The client device 100 may execute the received 'code block 1' to display a 'user interface screen 1' corresponding to the 'step 1' of the onboarding process, on a screen. The client device 100 may confirm the occurrence of an event such as a user input on the displayed 'user interface screen 1'. In that case, the user input may confirm that the corresponding step of the onboarding process has been confirmed, or request a next step, and may further include selecting certain information or inputting information such as login information. In addition, if a certain condition such as a lapse of a certain period of time is met, the client device 100 may confirm that the corresponding step of the onboarding process has been confirmed, or process the next step as requested. Information on the event that has occurred at the client device 100 may be transmitted to the server 200.

In order to request the 'code block 2', which is the second code block of the user interface provision module corresponding to the target of onboarding, the client device 100 may transmit information on the onboarding target and identification information of the 'code block 1' that generates the user interface screen for onboarding to the server 200. The identification information of the 'code block 1' may be a key value in a code block.

The server 200 may transmit the 'code block 2', which is the second code block of the user interface provision module corresponding to the onboarding target, to the client device 100. The server 200 may recognize that a next code block to be transmitted to the client device 100 is the 'code block 2' from the received identification information of the 'code block 1' based on information on the process of onboarding corresponding to the order of the code blocks that generate the user interface screen. The client device 100 may execute the received 'code block 2' to display a 'user interface screen 2' corresponding to the 'step 2' of the onboarding process, on the screen. The client device 100 may identify the occurrence of an event such as a user input on the displayed 'user interface screen 2'. Information on the event that has occurred on the client device 100 may be transmitted to the server 200.

In order to request the 'code block 3', which is the third code block of the user interface provision module corresponding to the onboarding target, the client device 100 may transmit the information on the onboarding target and identification information of the 'code block 2' that generates the user interface screen for onboarding to the server 200. The identification information of the 'code block 2' may be a key value in the code block.

The server 200 may transmit the 'code block 3', which is the third code block of the user interface provision module corresponding to the onboarding target, to the client device 100. The client device 100 may execute the received 'code block 3' to display a 'user interface screen 3' corresponding to the 'step 3' of the onboarding process, on the screen. The client device 100 may identify the occurrence of an event such as a user input on the displayed 'user interface screen 3'. Information on the event that has occurred on the client device 100 may be transmitted to the server 200.

In terms of the user interface provision module, there may a different type of user interface provision module depending on an onboarding target. For example, if the target of onboarding is a user, there may be a user interface provision module for user onboarding, and if the target of onboarding is a device such as an image forming apparatus, there may be a user interface provision module for a device.

Figure 5:
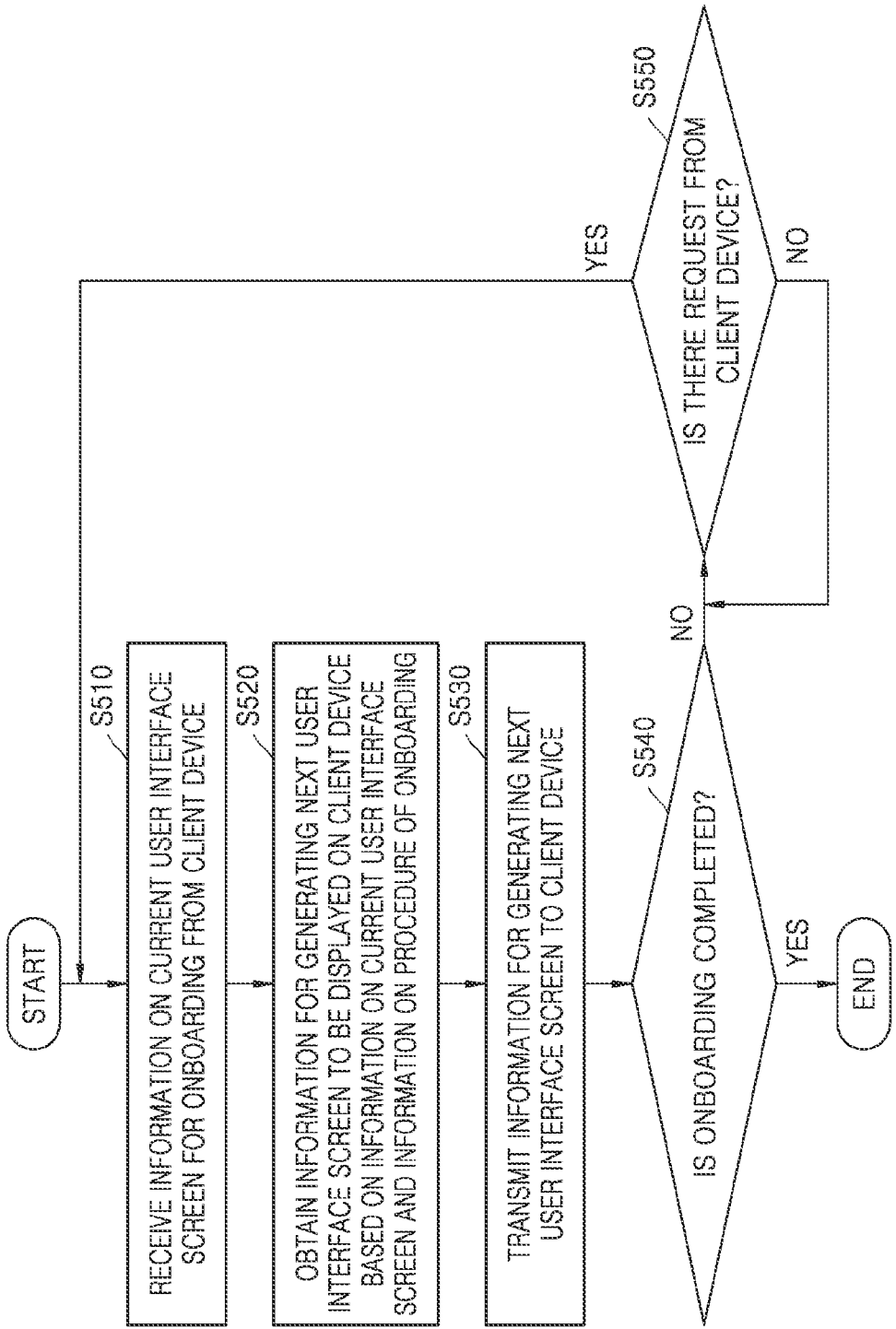
FIG. 5 is a flowchart illustrating a method of onboarding according to an example.

FIG. 5 is a flowchart illustrating a method of onboarding according to an example.

Referring to FIG. 5, the server 200 may receive information on a current user interface screen for onboarding from the client device 100 in operation S510. For example, the server 200 may receive information on a target of onboarding and identification information of information for generating the current user interface screen, such as identification information of a code block that generates the current user interface screen for onboarding. The client device 100 may transmit the information on the current user interface screen for onboarding to the server 200 to request a next user interface screen for onboarding of the server 200.

The server 200 may obtain information for generating the next user interface screen to be displayed on the client device 100 based on the information on the current user interface screen received from the client device 100 and information on the process of onboarding in operation S520. As an example, the server 200 may receive information on an event that has occurred on the current user interface screen displayed on the client device 100 from the client device 100, and may obtain the information for generating the next user interface screen to be displayed on the client device 100 based on the information on the current user interface screen, the information on the onboarding process, and the received information on the event. The server 200 may obtain the information for generating the next user interface screen to be displayed on the client device 100 according to whether the process of onboarding corresponding to the current user interface screen is completed and further based on the information on the event. If the process of onboarding corresponding to the current user interface screen is completed, the server 200 may obtain information for generating a user interface screen corresponding to a next order, and, if the process of onboarding corresponding to the current user interface screen is not completed, the server 200 may obtain again the information for generating the current user interface screen.

For example, the server 200 may obtain a user interface provision module from a database based on identification information of the user interface provision module corresponding to the target of onboarding. The server 200 may extract the information for generating the next user interface screen to be displayed on the client device 100 from the obtained user interface provision module based on the identification information of the information for generating the current user interface screen. For example, the server 200 may select a code block that generates the next user interface screen to be displayed on the client device 100 from among code blocks included in the user interface provision module based on the sequence of the code block corresponding to the identification information received from the client device 100.

As another example, the server 200 may receive the user interface provision module from an external server in response to the identification information of the user interface provision module corresponding to the target of onboarding transmitted to the external server. If the target of onboarding is a user, the server 200 may receive the user interface provision module for user onboarding from the external server through the communication interface unit 230 in response to the identification information of the user interface provision module for user onboarding transmitted to the external server. If the target of onboarding is an image forming apparatus, the server 200 may further receive device identification information of the image forming apparatus from the client device 100 through the communication interface unit 230. The server 200 may receive device type information of the image forming apparatus from the external server in response to the received device identification information transmitted to the external server, and may receive the user interface provision module for device onboarding from the external server in response to the identification information of the user interface provision module for a device based on the received device type information transmitted to the external server.

The server 200 may extract the information for generating the next user interface screen to be displayed on the client device 100 from the user interface provision module received from the external server based on the identification information of the information for generating the current user interface screen. The server 200 may select the code block that generates the next user interface screen to be displayed on the client device 100 from among the code blocks included in the user interface provision module based on the sequence of the code block corresponding to the identification information of the information for generating the current user interface screen received from the client device 100. If the server 200 further receives information on an event that has occurred on the user interface screen displayed on the client device 100 from the client device 100, the server 200 may select any one of code blocks following the code block corresponding to the received identification information based on the received information on the event.

The server 200 may transmit the information for generating the next user interface screen to be displayed on the client device 100 to the client device 100 in operation S530. For example, the server 200 may transmit a code block that generates an optimum user interface screen to be displayed on the client device 100 among code blocks that generate user interface screens corresponding to a series of steps for onboarding to the client device 100. The client device 100 may receive the information for generating the next user interface screen from the server 200, and may control the next user interface screen to be displayed based on the received information for generating the next user interface screen. For example, the client device 100 may execute the code block received from the server 200 to generate and display the user interface screen for onboarding.

The server 200 may determine whether onboarding is completed in operation S540. For example, the server 200 may determine whether a last code block of the code blocks that generate the user interface screens corresponding to the series of steps for onboarding is transmitted to the client device 100. If the last code block is transmitted to the client device 100, the server 200 may determine that onboarding is completed, and if not, the server 200 may determine that onboarding is not completed.

If the server 200 determines that onboarding is not completed, the server 200 may check whether there is any request for the user interface screen for onboarding from the client device 100 in operation S550. For example, the client device 100 may transmit the information on the current user interface screen displayed on the client device 100 to the server 200 to request the next user interface screen for onboarding of the server 200. If the server 200 receives the information on the target of onboarding and identification information of information for generating the user interface screen for onboarding from the client device 100, the server 200 may determine that there is a request for the user interface screen for onboarding, and if not, the server 200 may wait for a request for the user interface screen for onboarding from the client device 100. If there is a request for the user interface screen for onboarding, the server 200 may repeat operations S510 to S540 described above.

Figure 6:
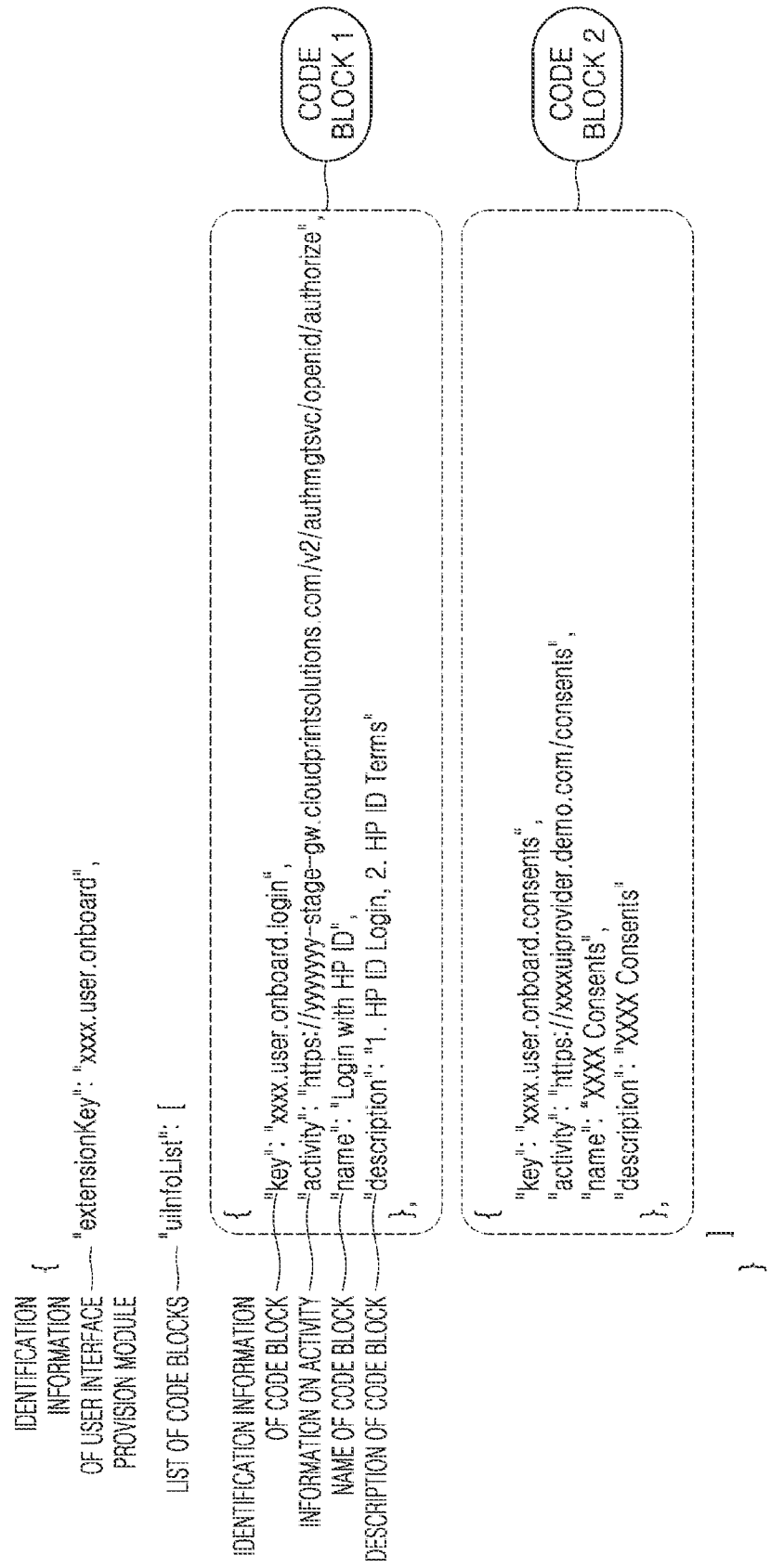
FIG. 6 is a diagram illustrating a user interface provision module for user onboarding according to an example.
Figure 7:
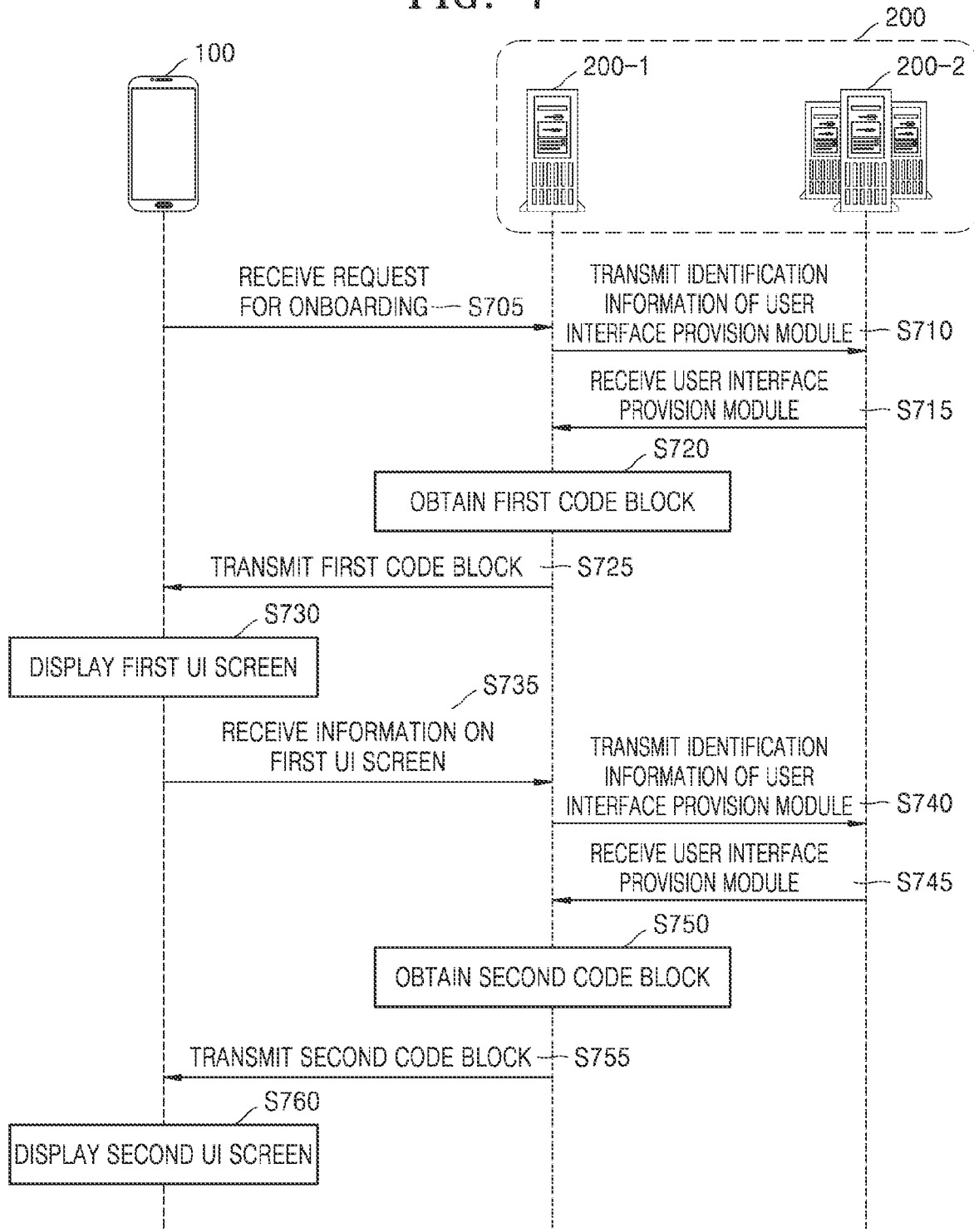
FIG. 7 is a diagram illustrating a process of performing user onboarding according to an example.

FIG. 6 is a diagram illustrating a user interface provision module for user onboarding according to an example. FIG. 7 is a diagram illustrating a process of performing user onboarding according to an example.

Referring to FIG. 6, a user interface provision module for user onboarding may include identification information of the user interface provision module and a list of code blocks. If there are user interface provision modules, the identification information of the user interface provision module may be information for identifying a corresponding user interface provision module. As an example, 'xxxx.user.Onboard' may become the identification information of the user interface provision module in FIG. 6. The list of the code blocks may include code blocks that generate user interface screens corresponding to a series of steps for onboarding.

Each code block included in the list of code blocks may include identification information of the code block, information on an activity to be performed by the client device 100, a name of the code block, and a description of the code block, as illustrated in FIG. 6. However, examples of the present disclosure are not limited thereto. The identification information of the code block may include information for identifying the code block when the list of code blocks includes a plurality of code blocks. The information on the activity that may include uniform recourse locator (URL) information may be used in retrieving information on an embedded screen stored in the client device 100 through a corresponding URL or redirecting the same to the corresponding URL, which is an operation to be performed by the client device 100. Hereinafter, an example process of performing user onboarding will be described with respect to FIG. 7, using the example of the user interface provision module for user onboarding of FIG. 6.

Referring to FIG. 7, an example is described in which the server 200 includes a first server 200-1 and a second server 200-2. However, examples of the present disclosure are not limited thereto. The first server 200-1 may be a server to process a request for onboarding from the client device 100, and the second server 200-2 may be a cloud platform-based server to support various services. The user interface provision module for user onboarding may be managed by the second server 200-2.

The first server 200-1 may receive a request for onboarding from the client device 100 in operation S705. The client device 100 may transmit information that a target of onboarding is a user, and identification information of a code block that generates a user interface screen for onboarding to the first server 200-1. If user onboarding using the user interface provision module for user onboarding of FIG. 6 is performed, the client device 100 may transmit the information that the target of onboarding is the user, that is, 'xxxx.user.onboard', as information on the type of onboarding and a 'null' value as the identification information of the code block to the first server 200-1. The fact that the identification information of the code block is 'null' refers to the start of onboarding.

The first server 200-1 may transmit the identification information of the user interface provision module for user onboarding to the second server 200-2 in operation S710. As an example, the first server 200-1 may confirm the identification information of the user interface provision module for user onboarding based on the information that the target of onboarding is the user. The first server 200-1 may transmit 'xxxx.user.onboard', which is the identification information of the user interface provision module for user onboarding, to the second server 200-2 to request the user interface provision module for user onboarding.

The first server 200-1 may receive the user interface provision module for user onboarding from the second server 200-2 in operation S715. As an example, the second server 200-2 may obtain the user interface provision module for user onboarding stored in a database and transmit the user interface provision module for user onboarding to the first server 200-1 in response to a request of the first server 200-1 for the user interface provision module for user onboarding. The user interface provision module for user onboarding may be transmitted to the first server 200-1, as illustrated in FIG. 6.

The first server 200-1 may obtain a first code block from among the code blocks that generate the user interface screens corresponding to the series of steps for user onboarding in operation S720. As an example, the first server 200-1 may select the first code block from among the code blocks included in the user interface provision module for user onboarding received from the second server 200-2 based on the identification information of the code block received from the client device 100 and the sequence of the series of steps for user onboarding. Because the identification information of the code block received by the first server 200-1 from the client device 100 is 'null' in operation S705, the first code block of which the identification information of the code block is 'xxxx.user.onboard.login' may be selected from the list of the code blocks of the user interface provision module for user onboarding of FIG. 6.

The first server 200-1 may transmit the first code block to the client device 100 in operation S725. As an example, the first server 200-1 may transmit the first code block of which the identification information of the code block is 'xxxx.user.onboard.login' to the client device 100. The client device 100 may receive the first code block, which is information for generating the user interface screen for onboarding, from the first server 200-1.

The client device 100 may execute the first code block, which is the information for generating the user interface screen for onboarding received from the first server 200-1, to display a first user interface screen in operation S730. As an example, the client device 100 may execute the first code block of which the identification information of the code block is 'xxxx.user.onboard.login' to display the first user interface screen for performing a login.

The first server 200-1 may receive information on the first user interface screen from the client device 100 in operation S735. As an example, the client device 100 may transmit the information that the target of onboarding is the user, and 'xxxx.user.onboard.login', which is the identification information of the first code block, as information on a current user interface screen to the first server 200-1.

The first server 200-1 may transmit the identification information of the user interface provision module for user onboarding to the second server 200-2 in operation S740. The first server 200-1 may receive the user interface provision module for user onboarding from the second server 200-2 in operation S745. Since descriptions on operations S740 and S745 are the same as the foregoing descriptions given on operations S710 and S715, descriptions thereof will be omitted.

The first server 200-1 may obtain a second code block from among the code blocks that generate the user interface screens corresponding to the series of steps for user onboarding in operation S750. As an example, the first server 200-1 may select the second code block from among the code blocks included in the user interface provision module for user onboarding received from the second server 200-2 based on the identification information of the code block received from the client device 100 and the sequence of the series of steps for user onboarding. Because the identification information of the code block received by the first server 200-1 from the client device 100 in operation S735 is 'xxxx.user.onboard.login', the second code block of which the identification information of code block is 'xxxx.user.onboard.consents', and which is a next-order code block of the first code block of which the identification information of code block is 'xxxx.user.onboard.login', may be selected from the list of code blocks of the user interface provision module for user onboarding of FIG. 6.

The first server 200-1 may transmit the second code block to the client device 100 in operation S755. As an example, the first server 200-1 may transmit the second code block of which the identification information of the code block is 'xxxx.user.onboard.consents' to the client device 100. The client device 100 may receive the second code block that generates a next user interface screen to be displayed on the client device 100 from the first server 200-1 in response to the information on the current user interface screen transmitted to the first server 200-1 in operation S735.

The client device 100 may execute the second code block received from the first server 200-1 to display a second user interface screen in operation S760. As an example, the client device 100 may execute the second code block of which the identification information of the code block is 'xxxx.user.onboard.consents' to display the second user interface screen for requesting consent of the user.

If there is an event such as a user input, such as inputting information or intention of consent on the user interface screen displayed on the client device 100, the client device 100 may transmit information on the corresponding event to the first server 200-1. The first server 200-1 may select a code block that generates the next user interface screen to be displayed on the client device 100 according to whether the process of onboarding corresponding to the current user interface screen is completed and further based on information on the event received from the client device 100, in the case of selecting the code block that generates the user interface screen to be displayed on the client device 100.

Figure 8:
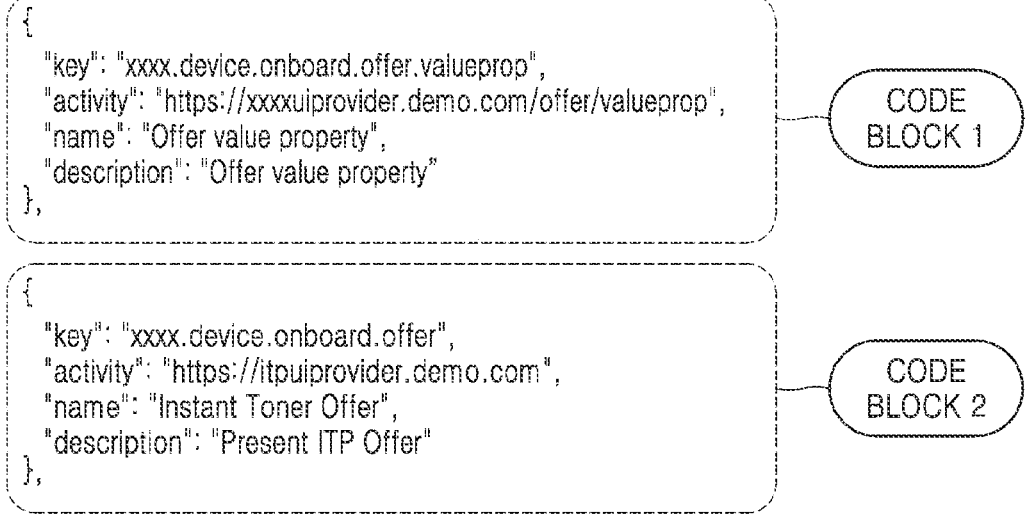

FIGS. 8 and 9 are diagrams illustrating a user interface provision module for device onboarding according to an example. FIG. 10 is a diagram illustrating a process of performing device onboarding according to an example.

According to an example of the user interface provision module for device onboarding of FIG. 8, identification information of the user interface provision module is 'xxxx.device.onboard.Flex', and two code blocks are included in a list of code blocks. Identification information of a first code block is 'xxxx.device.onboard.offer.valueprop', and identification information of a second code block is 'xxxx.device.onboard.offer'. That is, the user interface provision module for device onboarding of FIG. 8 may generate user interface screens corresponding to two steps for device onboarding.

According to another example of the user interface provision module for device onboarding of FIG. 9, identification information of the user interface provision module is 'xxxx.device.onboard.E2E', and three code blocks are included in a list of code blocks. Identification information of a first code block is 'xxxx.device.onboard.program', identification information of a second code block is 'xxxx.device.onboard.offer.valueprop', and identification information of a third code block is 'xxxx.device.onboard.offer'. That is, the user interface provision module for device onboarding of FIG. 9 may generate user interface screens corresponding to three steps for device onboarding.

The user interface provision module for device onboarding according to the examples of FIGS. 8 and 9 is based on device type information of an image forming apparatus to be registered. The user interface provision module for device onboarding of FIG. 8 is for onboarding of an image forming apparatus that uses non-genuine toner, and the user interface provision module for device onboarding of FIG. 9 is for onboarding of an image forming apparatus that uses genuine toner. Hereinafter, an example process of performing device onboarding will be described with respect to FIG. 10 using examples of the user interface provision module for device onboarding of FIGS. 8 and 9.

Referring to FIG. 10, an example is described in which the server 200 includes the first server 200-1 and the second server 200-2. However, examples of the present disclosure are not limited thereto. The first server 200-1 may be a server to process a request for onboarding from the client device 100, and the second server 200-2 may be a cloud platform-based server to support various services. The user interface provision module for device onboarding may be managed by the second server 200-2.

The client device 100 may request device identification information of the image forming apparatus, which is the target of onboarding, in operation S1005. As an example, the device identification information may be in various forms, and the client device 100 may request a plurality of pieces of device identification information of different types.

The client device 100 may receive the device identification information from the image forming apparatus in operation S1010. In an example, because the device identification information may be used in device onboarding of the image forming apparatus, the client device 100 may prepare the device identification information of the image forming apparatus to be registered for device onboarding in advance.

The first server 200-1 may receive the device identification information and the request for onboarding from the client device 100 in operation S1015. As an example, the client device 100 may transmit the device identification information, information indicating that a target of onboarding is the image forming apparatus, and identification information of a code block that generates a user interface screen for onboarding to the first server 200-1. If device onboarding that uses the user interface provision module for device onboarding of FIG. 8 or FIG. 9 is performed, the client device 100 may transmit the information indicating that the target of onboarding is the image forming apparatus, in other words, 'xxxx.device.onboard', as information on onboarding type, and a 'null' value as the identification information of code block to the first server 200-1.

The first server 200-1 may transmit the device identification information received from the client device 100 to the second server 200-2 in operation S1020. For example, the first server 200-1 may transmit device identification information of the first image forming apparatus that uses non-genuine toner, or device identification information of the second image forming apparatus that uses genuine toner to the second server 200-2.

In operation S1025, the first server 200-1 may receive device type information from the second server 200-2 in response to the device identification information transmitted to the second server 200-2. For example, the first server 200-1 may receive 'Flex' device type information from the second server 200-2 in response to the device identification information of the first image forming apparatus that uses non-genuine toner transmitted to the second server 200-2. The first server 200-1 may receive 'E2E' device type information from the second server 200-2 in response to the device identification information of the second image forming apparatus that uses genuine toner transmitted to the second server 200-2.

The first server 200-1 may transmit the identification information of the user interface provision module for device onboarding based on the device type information to the second server 200-2 in operation S1030, For example, the first server 200-1 may transmit 'xxxx.device.onboard-.Flex' as the identification information of the user interface provision module for device onboarding of the first image forming apparatus that uses non-genuine toner to the second server 200-2 to request the user interface provision module for device onboarding of FIG. 8. The first server 200-1 may transmit 'xxxx.device.onboard.E2E' as the identification information of the user interface provision module for device onboarding of the second image forming apparatus that uses genuine toner to the second server 200-2 to request the user interface provision module for device onboarding of FIG. 9.

The first server 200-1 may receive the user interface provision module for device onboarding from the second server 200-2 in operation S1035. For example, the second server 200-2 may obtain the user interface provision module for device onboarding stored in a database and transmit the user interface provision module for device onboarding to the first server 200-1 in response to a request of the first server 200-1 for the user interface provision module for device onboarding. Depending on the device type information of the image forming apparatus, which is the target of onboarding, the user interface provision module for device onboarding may be transmitted to the first server 200-1, as illustrated in FIG. 8 or FIG. 9.

The first server 200-1 may obtain a first code block from among code blocks that generate user interface screens corresponding to a series of steps for device onboarding in operation S1040. In an example, the first server 200-1 may select the first code block from among code blocks included in the user interface provision module for device onboarding received from the second server 200-2 based on the identification information of the code block received from the client device 100 and the sequence of the series of steps for device onboarding. Because the identification information of the code block received in operation S1015 from the client device 100 is 'null', if the user interface provision module for device onboarding of FIG. 8 is received, the first code block of which the identification information of code block is 'xxxx.device.onboard.offer.valueprop' may be selected, and if the user interface provision module for device onboarding of FIG. 9 is received, the first code block of which the identification information of code block is 'xxxx.device.onboard.program' may be selected.

The first server 200-1 may transmit the first code block to the client device 100 in operation S1045. As an example, if the user interface provision module for device onboarding of FIG. 8 is received, the first server 200-1 may transmit the first code block of which the identification information of code block is 'xxxx.device.onboard.offer.valueprop' to the client device 100. As another example, if the user interface provision module for device onboarding of FIG. 9 is received, the first server 200-1 may transmit the first code block of which the identification information of code block is 'xxxx.device.onboard.program' to the client device 100.

The client device 100 may execute the first code block received from the first server 200-1 to display a first user interface screen in operation S1050. As an example, the client device 100 may execute the first code block of which the identification information of code block is 'xxxx.device.onboard.offer.valueprop' in the case of the user interface provision module for device onboarding of FIG. 8 or the first code block of which the identification information of code block is 'xxxx.device.onboard.program' in the case of the user interface provision module for device onboarding of FIG. 9 to display the first user interface screen.

The first server 200-1 may receive information on the first user interface screen from the client device 100 in operation S1055. For example, the client device 100 may transmit the device identification information, the information indicating that the target of onboarding is the image forming apparatus, and the identification information of the first code block to the first server 200-1 as information on a current user interface screen. As described above, the identification information of the first code block is 'xxxx.device.onboard.offer.valueprop' in the case of the user interface provision module for device onboarding of FIG. 8 or 'xxxx.device.onboard.program' in the case of the user interface provision module for device onboarding of FIG. 9.

The first server 200-1 may transmit the device identification information received from the client device 100 to the second server 200-2 in operation S1060. In operation S1065, the first server 200-1 may receive the device type information from the second server 200-2 in response to the device identification information transmitted to the second server 200-2. Since descriptions on operations S1060 and S1065 are the same as the foregoing descriptions given on operations S1020 and S1025, descriptions thereof will be omitted.

The first server 200-1 may transmit the identification information of the user interface provision module for device onboarding based on the device type information to the second server 200-2 in operation S1070. In operation S1075, the first server 200-1 may receive the user interface provision module for device onboarding from the second server 200-2. Since descriptions on operations S1070 and S1075 are the same as the foregoing descriptions given on operations S1030 and S1035, descriptions thereof will be omitted.

The first server 200-1 may obtain a second code block from among the code blocks that generate the user interface screens corresponding to the series of steps for device onboarding in operation 1080. As an example, the first server 200-1 may select the second code block from among the code blocks included in the user interface provision module for device onboarding received from the second server 2002 based on the identification information of the code block received from the client device 100 and the sequence of the series of steps for user onboarding. The identification information of the code block that the first server 200-1 has received from the client device 100 in operation S1055 is 'xxxx.device.onboard.offer.valueprop' in the case of the user interface provision module for device onboarding of FIG. 8 or 'xxxx.device.onboard.program' in the case of the user interface provision module for device onboarding of FIG. 9. In a case in which the user interface provision module for device onboarding of FIG. 8 is received, the first server 200-1 may select the second code block of which the identification information of code block is 'xxxx.device.onboard.offer', and which is a next-order code block of the first code block of which the identification information of code block is 'xxxx.device.onboard.offer.valueprop', from the list of code blocks. In a case in which the user interface provision module for device onboarding of FIG. 9 is received, the first server 200-1 may select the second code block of which the identification information of code block is 'xxxx.device.onboard.offer.valueprop', and which is a next-order code block of the first code block of which the identification information of code block is 'xxxx.device.onboard.program', from the list of code blocks.

The first server 200-1 may transmit the second code block to the client device 100 in operation S1085. According to various examples, in a case in which the user interface provision module for device onboarding of FIG. 8 is received, the first server 200-1 may transmit the second code block of which the identification information of code block is 'xxxx.device.onboard.offer' to the client device 100, and in a case in which the user interface provision module for device onboarding of FIG. 9 is received, the first server 200-1 may transmit the second code block of which the identification information of code block is 'xxxx.device.onboard.offer.valueprop' to the client device 100. The client device 100 may receive the second code block, which is information for generating a next user interface screen to be displayed on the client device 100, from the first server 200-1 in response to the information on the current user interface screen that was transmitted to the first server 200-1 in operation S1055.

The client device 100 may execute the second code block received from the first server 200-1 to display a second user interface screen in operation S1090. For example, the client device 100 may execute the second code block of which the identification information of code block is 'xxxx.device.onboard.offer' or the second code block of which the identification information of code block is 'xxxx.device.onboard-.offer.valueprop' to display the second user interface screen.

Because the user interface provision module for device onboarding of FIG. 8 includes two code blocks, if the second user interface screen is displayed on the client device 100, or a user input is displayed on the displayed second user interface screen, device onboarding may be completed. Because the user interface provision module for device onboarding of FIG. 9 further includes a third code block of which the identification information of code block is 'xxxx.device.onboard.offer', the client device 100 may display a third user interface screen corresponding to the third code block in the same manner as displaying the second user interface screen after displaying the first user interface screen.

In a case in which there is an event such as a user input, such as inputting information or an intention of consent on the user interface screen displayed on the client device 100, the client device 100 may transmit information on the corresponding event to the first server 200-1. The first server 200-1 may select a code block that generates the next user interface screen to be displayed on the client device 100 according to whether the process of onboarding corresponding to the current user interface screen is completed and further based on the information on the event received from the client device 100, in the case of selecting a code block that generates the user interface screen to be displayed on the client device 100.

The above-described examples may be implemented in the form of a non-transitory computer-readable storage medium storing instructions executable by a processor. A computer is a device capable of invoking stored instructions from a storage medium and operating according to an example disclosed according to the invoked instructions and may include a client device and a server according to disclosed examples. Examples of the non-transitory computer-readable storage media may include read-only memory (ROM), random-access memory (RAM), flash memory, compact disc (CD)-ROMs, CD-recordables (Rs), CD+Rs, CD-rewritables (RWs), CD+RWs, and digital versatile disc (DVD)-ROMs, DVD-Rs, DVD+Rs, DVD-RWs, DVD+RWs, DVD-RAMs, blu-ray disc (BD)-ROMs, BD-Rs, BD-recordable low to highs (R LTHs), BD-REs, magnetic tapes, floppy disks, magneto-optical data storage devices, optical data storage devices, hard disks, solid-state disks (SSDs), and any device capable of storing instructions or machine readable instructions, associated data, data files, and data structures, and providing a processor or computer with instructions or machine readable instructions, associated data, data files, and data structures such that the processor or computer may execute the instructions.

A method according to the disclosed examples may be provided in the form of a computer program. Such a computer program may include an application in the form of a machine readable instructions program that is electronically distributed through a manufacturer of a client device such as an image forming apparatus, a third party server, or an online contents marketplace such as an application store. In addition, such a computer program may be stored in a storage medium of the server 200 or a storage medium of the client device 100, and may implement a method according to examples disclosed by the server 200 or the client device 100 executing the computer program.

What is claimed is:

1. A server comprising:
a communication interface unit;
a memory to store instructions; and
a processor to execute the instructions to:
receive information on a current user interface screen for onboarding from a client device through the communication interface unit, and
transmit information for generating a next user interface screen to be displayed on the client device to the client device through the communication interface unit based on the received information on the current user interface screen and information on a process of the onboarding.

2. The server of claim 1, wherein the information on the current user interface screen comprises information on a target of the onboarding and identification information of information for generating the current user interface screen.

3. The server of claim 2, wherein the processor is to:
receive, in response to transmitting identification information of a user interface provision module corresponding to the target of the onboarding to an external sever, the user interface provision module from the external server through the communication interface unit, and
extract the information for generating the next user interface screen to be displayed on the client device from the received user interface provision module based on the identification information of the information for generating the current user interface screen.

4. The server of claim 3, wherein, in a case in which the target of the onboarding is a user, the processor is to receive, in response to transmitting identification information of the user interface provision module for user onboarding to the external server, the user interface provision module for the user onboarding from the external server through the communication interface unit.

5. The server of claim 3, wherein, in a case in which the target of onboarding is an image forming apparatus, the information on the current user interface screen further comprises device identification information of the image forming apparatus, and the processor is to:
receive, in response to transmitting the device identification information to the external server, device type information of the image forming apparatus from the external server through the communication interface unit, and receive, in response to transmitting identification information of the user interface provision module for device onboarding based on the received device type information, the user interface provision module for the device onboarding from the external server.

6. The server of claim 2, wherein the information on the current user interface screen further comprises information on an event that has occurred on the current user interface screen displayed on the client device, and
wherein the processor is to transmit the information for generating the next user interface screen to be displayed on the client device based on the information on the event.

7. The server of claim 6, wherein the processor is to transmit the information for generating the next user interface screen to be displayed on the client device according to whether a process of onboarding corresponding to the current user interface screen is completed and based on the information on the event.

8. The server of claim 2, wherein the processor is to:
obtain, based on identification information of a user interface provision module corresponding to the target of the onboarding, the user interface provision module from a database, and
extract the information for generating the next user interface screen to be displayed on the client device from the obtained user interface provision module based on the identification information of the information for generating the current user interface screen.

9. A client device comprising:
a communication interface unit;
a user interface unit;
a memory to store instructions; and
a processor to execute the instructions to:
transmit information on a current user interface screen for onboarding to a server through the communication interface unit,
receive information for generating a next user interface screen from the server through the communication interface unit, and
control the next user interface screen to be displayed on the user interface unit based on the received information for generating the next user interface screen.

10. The client device of claim 9, wherein the information on the current user interface screen comprises information on a target of the onboarding, and identification information of information for generating the current user interface screen.

11. The client device of claim 10, wherein the information on the target of the onboarding indicates that the target of the onboarding comprises a user, a device, or machine readable instructions.

12. The client device of claim 11, wherein, in a case where the target of the onboarding is an image forming apparatus, the information on the current user interface screen further comprises device identification information of the image forming apparatus.

13. The client device of claim 10, wherein the information on the current user interface screen further comprises information on an event that has occurred on the current user interface screen displayed on the user interface unit.

14. The client device of claim 13, wherein the processor is to receive, in response to transmitting the information on the current user interface screen to the server, the information for generating the next user interface screen from the server through the communication interface unit, according to whether a process of onboarding corresponding to the current user interface screen is completed and based on the information on the event.

15. A non-transitory computer-readable storage medium storing instructions executable by a processor, the computer-readable storage medium comprising:
instructions to receive information on a current user interface screen for onboarding from a client device; and
instructions to transmit information for generating a next user interface screen to be displayed on the client device to the client device based on the received information on the current user interface screen and information on a process of the onboarding.

* * * * *